US008126272B2

(12) United States Patent
Carr et al.

(10) Patent No.: US 8,126,272 B2
(45) Date of Patent: *Feb. 28, 2012

(54) METHODS COMBINING MULTIPLE FRAMES OF IMAGE DATA

(75) Inventors: J. Scott Carr, Los Gatos, CA (US);
Brett Alan Bradley, Portland, OR (US);
Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 151 days.

This patent is subject to a terminal disclaimer.

(21) Appl. No.: 12/050,000

(22) Filed: Mar. 17, 2008

(65) Prior Publication Data

US 2008/0181450 A1 Jul. 31, 2008

Related U.S. Application Data

(63) Continuation of application No. 09/563,663, filed on May 2, 2000, now Pat. No. 7,346,184.

(51) Int. Cl.
*G06K 9/00* (2006.01)
(52) U.S. Cl. ......... 382/181; 382/100; 382/284; 382/294
(58) Field of Classification Search ........... 382/100.181, 382/284
See application file for complete search history.

(56) References Cited

U.S. PATENT DOCUMENTS

| 3,805,238 | A | 4/1974 | Rothfjell |
| 4,396,903 | A | 8/1983 | Habicht et al. |
| 4,590,366 | A | 5/1986 | Rothfjell |
| 4,675,746 | A | 6/1987 | Tetrick et al. |
| 4,689,477 | A | 8/1987 | Goldman |
| 4,876,617 | A | 10/1989 | Best et al. |
| 4,939,674 | A | 7/1990 | Price |
| 4,949,391 | A | * 8/1990 | Faulkerson et al. ........... 382/313 |
| 4,972,476 | A | 11/1990 | Nathans |
| 4,993,068 | A | 2/1991 | Piosenka et al. |
| 5,079,648 | A | 1/1992 | Maufe |
| 5,237,164 | A | 8/1993 | Takada |
| 5,262,860 | A | 11/1993 | Fitzpatrick et al. |

(Continued)

FOREIGN PATENT DOCUMENTS

EP  0 629 972  12/1994

(Continued)

OTHER PUBLICATIONS

Bajesy et al, "Detection of Diffuse and Specular Interference Reflections and Inter-Reflections by Color Image Segmentation," International Journal of Computer Vision, vol. 17, No. 3, pp. 241-272, 1996.

(Continued)

*Primary Examiner* — Tom Y Lu

(57) ABSTRACT

In one embodiment a document authentication station, for use with passports or the like, includes a 2D image sensor (e.g., CCD- or CMOS-based video camera), and a computer device. The image sensor produces produce image data corresponding to a presented document. From this image data, the computer extracts two or more identification data. One is a digital watermark. The other can be a bar code, data glyphs, OCR data, etc. The processor then proceeds to check that the two identification data correspond in an expected fashion. If not, the document is flagged as suspect or fake. Reliability of detection can be enhanced by processing plural frames of data from the image sensor before issuing a result.

21 Claims, 1 Drawing Sheet

U.S. PATENT DOCUMENTS

| | | |
|---|---|---|
| 5,284,364 A | 2/1994 | Jain |
| 5,319,453 A | 6/1994 | Copriviza et al. |
| 5,337,361 A | 8/1994 | Wang et al. |
| 5,354,097 A | 10/1994 | Tel |
| 5,379,345 A | 1/1995 | Greenberg |
| 5,384,846 A | 1/1995 | Berson et al. |
| 5,434,403 A | 7/1995 | Amir et al. |
| 5,436,970 A | 7/1995 | Ray et al. |
| 5,438,188 A | 8/1995 | Surka |
| 5,446,273 A | 8/1995 | Leslie |
| 5,457,308 A | 10/1995 | Spitz et al. |
| 5,469,506 A | 11/1995 | Berson et al. |
| 5,471,533 A | 11/1995 | Wang et al. |
| 5,485,554 A | 1/1996 | Lowitz et al. |
| 5,490,217 A | 2/1996 | Wang et al. |
| 5,499,294 A | 3/1996 | Friedman |
| 5,509,083 A | 4/1996 | Abtahi et al. |
| 5,513,264 A | 4/1996 | Wang |
| 5,625,720 A * | 4/1997 | Miyaza et al. ............... 382/284 |
| 5,636,292 A | 6/1997 | Rhoads |
| 5,646,997 A | 7/1997 | Barton |
| 5,652,626 A | 7/1997 | Kawakami et al. |
| 5,659,726 A | 8/1997 | Sandford et al. |
| 5,664,018 A | 9/1997 | Leighton |
| 5,682,030 A | 10/1997 | Kubon |
| 5,694,471 A | 12/1997 | Chen et al. |
| 5,708,717 A | 1/1998 | Alasia |
| 5,710,834 A | 1/1998 | Rhoads |
| 5,721,788 A | 2/1998 | Powell et al. |
| 5,745,604 A | 4/1998 | Rhoads |
| 5,748,763 A | 5/1998 | Rhoads |
| 5,748,783 A | 5/1998 | Rhoads |
| 5,760,386 A | 6/1998 | Ward |
| 5,767,987 A | 6/1998 | Wolff et al. |
| 5,768,426 A | 6/1998 | Rhoads |
| 5,787,186 A | 7/1998 | Schroeder |
| 5,799,092 A | 8/1998 | Kristol et al. |
| 5,811,779 A | 9/1998 | Gaylord et al. |
| 5,822,436 A | 10/1998 | Rhoads |
| 5,832,119 A | 11/1998 | Rhoads |
| 5,841,886 A | 11/1998 | Rhoads |
| 5,850,481 A | 12/1998 | Rhoads |
| 5,859,920 A | 1/1999 | Daly et al. |
| 5,862,260 A | 1/1999 | Rhoads |
| 5,864,622 A | 1/1999 | Marcus |
| 5,864,623 A | 1/1999 | Messina et al. |
| 5,890,742 A | 4/1999 | Waller |
| 5,907,149 A | 5/1999 | Marckini |
| 5,912,934 A | 6/1999 | Acks et al. |
| 5,912,974 A | 6/1999 | Holloway et al. |
| 5,995,105 A | 11/1999 | Reber et al. |
| 5,995,625 A | 11/1999 | Sudia et al. |
| 6,000,612 A | 12/1999 | Xu |
| 6,024,287 A | 2/2000 | Takai et al. |
| 6,026,193 A | 2/2000 | Rhoads |
| 6,031,914 A | 2/2000 | Tewfik et al. |
| 6,031,930 A | 2/2000 | Bacus |
| 6,075,905 A | 6/2000 | Herman |
| 6,086,707 A | 7/2000 | Waller |
| 6,088,612 A | 7/2000 | Blair |
| 6,095,566 A | 8/2000 | Yamamoto et al. |
| 6,122,392 A | 9/2000 | Rhoads |
| 6,122,403 A | 9/2000 | Rhoads |
| 6,185,312 B1 | 2/2001 | Nakamura et al. |
| 6,185,316 B1 | 2/2001 | Buffam |
| 6,208,765 B1 | 3/2001 | Bergen |
| 6,226,387 B1 | 5/2001 | Tewfik et al. |
| 6,233,684 B1 | 5/2001 | Stefik et al. |
| 6,240,219 B1 | 5/2001 | Gregory |
| 6,243,480 B1 | 6/2001 | Zhao et al. |
| 6,266,430 B1 | 7/2001 | Rhoads |
| 6,277,067 B1 | 8/2001 | Blair |
| 6,285,776 B1 | 9/2001 | Rhoads |
| 6,289,108 B1 | 9/2001 | Rhoads |
| 6,292,092 B1 | 9/2001 | Chow et al. |
| 6,307,949 B1 | 10/2001 | Rhoads |
| 6,311,214 B1 | 10/2001 | Rhoads |
| 6,330,335 B1 | 12/2001 | Rhoads |
| 6,332,693 B1 | 12/2001 | Dove |
| 6,343,138 B1 | 1/2002 | Rhoads |
| 6,353,672 B1 | 3/2002 | Rhoads |
| 6,363,159 B1 | 3/2002 | Rhoads |
| 6,369,904 B1 | 4/2002 | Bhattacharjya et al. |
| 6,385,329 B1 | 5/2002 | Sharma et al. |
| 6,389,151 B1 | 5/2002 | Carr et al. |
| 6,394,352 B1 | 5/2002 | De Renzis |
| 6,400,827 B1 | 6/2002 | Rhoads |
| 6,404,898 B1 | 6/2002 | Rhoads |
| 6,411,392 B1 | 6/2002 | Bender et al. |
| 6,430,302 B2 | 8/2002 | Rhoads |
| 6,449,379 B1 | 9/2002 | Rhoads |
| 6,463,416 B1 | 10/2002 | Messina |
| 6,466,253 B1 | 10/2002 | Honjoh |
| 6,466,618 B1 | 10/2002 | Messing |
| 6,493,469 B1 | 12/2002 | Taylor |
| 6,496,591 B1 | 12/2002 | Rhoads |
| 6,496,933 B1 | 12/2002 | Nunally |
| 6,519,352 B2 | 2/2003 | Rhoads |
| 6,522,771 B2 | 2/2003 | Rhoads |
| 6,535,617 B1 | 3/2003 | Hannigan et al. |
| 6,535,618 B1 | 3/2003 | Rhoads |
| 6,539,095 B1 | 3/2003 | Rhoads |
| 6,542,618 B1 | 4/2003 | Rhoads |
| 6,542,620 B1 | 4/2003 | Rhoads |
| 6,553,127 B1 | 4/2003 | Kurowski |
| 6,560,349 B1 | 5/2003 | Rhoads |
| 6,567,534 B1 | 5/2003 | Rhoads |
| 6,567,535 B2 | 5/2003 | Rhoads |
| 6,567,780 B2 | 5/2003 | Rhoads |
| 6,570,613 B1 | 5/2003 | Howell |
| 6,574,350 B1 | 6/2003 | Rhoads et al. |
| 6,580,819 B1 | 6/2003 | Rhoads |
| 6,587,821 B1 | 7/2003 | Rhoads |
| 6,590,996 B1 | 7/2003 | Reed et al. |
| 6,590,997 B2 | 7/2003 | Rhoads |
| 6,594,403 B1 | 7/2003 | Bozdagi |
| 6,608,930 B1 | 8/2003 | Agnihotri |
| 6,614,914 B1 | 9/2003 | Rhoads et al. |
| 6,614,930 B1 | 9/2003 | Agnihotri |
| 6,621,524 B1 | 9/2003 | Iijima et al. |
| 6,625,297 B1 | 9/2003 | Bradley |
| 6,636,551 B1 | 10/2003 | Ikeda et al. |
| 6,647,129 B2 | 11/2003 | Rhoads |
| 6,654,480 B2 | 11/2003 | Rhoads |
| 6,654,887 B2 | 11/2003 | Rhoads |
| 6,665,454 B1 | 12/2003 | Silverbrook et al. |
| 6,675,146 B2 | 1/2004 | Rhoads |
| 6,683,966 B1 | 1/2004 | Tian et al. |
| 6,694,041 B1 | 2/2004 | Brunk |
| 6,724,912 B1 | 4/2004 | Carr et al. |
| 6,738,495 B2 | 5/2004 | Rhoads et al. |
| 6,744,907 B2 | 6/2004 | Rhoads |
| 6,750,985 B2 | 6/2004 | Rhoads et al. |
| 6,754,377 B2 | 6/2004 | Rhoads |
| 6,757,406 B2 | 6/2004 | Rhoads |
| 6,760,464 B2 | 7/2004 | Brunk |
| 6,768,808 B2 | 7/2004 | Rhoads |
| 6,771,796 B2 | 8/2004 | Rhoads |
| 6,778,682 B2 | 8/2004 | Rhoads |
| 6,782,116 B1 | 8/2004 | Zhao et al. |
| 6,804,377 B2 | 10/2004 | Reed |
| 6,804,379 B2 | 10/2004 | Rhoads |
| 6,843,566 B2 | 1/2005 | Mihara |
| 6,862,054 B2 | 3/2005 | Kawakami |
| 6,882,738 B2 | 4/2005 | Davis et al. |
| 6,944,298 B1 | 9/2005 | Rhoads |
| 6,959,100 B2 | 10/2005 | Rhoads |
| 6,959,386 B2 | 10/2005 | Rhoads |
| 6,961,444 B2 | 11/2005 | Levy |
| 6,965,873 B1 | 11/2005 | Rhoads |
| 6,970,573 B2 | 11/2005 | Carr et al. |
| 6,971,011 B1 | 11/2005 | Maes |
| 6,978,036 B2 | 12/2005 | Alattar et al. |
| 6,983,051 B1 | 1/2006 | Rhoads |
| 6,987,862 B2 | 1/2006 | Rhoads |
| 6,993,152 B2 | 1/2006 | Patterson et al. |
| 6,993,154 B2 | 1/2006 | Brunk |

| | | |
|---|---|---|
| 7,003,132 B2 | 2/2006 | Rhoads |
| 7,015,954 B1 | 3/2006 | Foote |
| 7,016,516 B2 | 3/2006 | Rhoads |
| 7,020,303 B2 | 3/2006 | Levy et al. |
| 7,020,349 B2 | 3/2006 | Brunk |
| 7,027,612 B2 | 4/2006 | Patterson et al. |
| 7,054,462 B2 | 5/2006 | Rhoads et al. |
| 7,054,463 B2 | 5/2006 | Rhoads et al. |
| 7,076,084 B2 | 7/2006 | Davis et al. |
| 7,113,569 B2 | 9/2006 | Okumura et al. |
| 7,113,615 B2 | 9/2006 | Rhoads et al. |
| 7,116,781 B2 | 10/2006 | Rhoads |
| 7,130,087 B2 | 10/2006 | Rhoads |
| 7,142,691 B2 | 11/2006 | Levy |
| 7,158,099 B1 | 1/2007 | Berube et al. |
| 7,181,022 B2 | 2/2007 | Rhoads |
| 7,184,570 B2 | 2/2007 | Rhoads |
| 7,197,164 B2 | 3/2007 | Levy |
| 7,218,751 B2 | 5/2007 | Reed |
| 7,239,734 B2 | 7/2007 | Alattar et al. |
| 7,242,790 B2 | 7/2007 | Rhoads |
| 7,246,239 B2 | 7/2007 | Rodriguez et al. |
| 7,248,715 B2 | 7/2007 | Levy |
| 7,263,203 B2 | 8/2007 | Rhoads et al. |
| 7,266,217 B2 | 9/2007 | Rhoads et al. |
| 7,269,275 B2 | 9/2007 | Carr et al. |
| 7,277,468 B2 | 10/2007 | Tian et al. |
| 7,286,684 B2 | 10/2007 | Rhoads et al. |
| 7,305,117 B2 | 12/2007 | Davis et al. |
| 7,313,253 B2 | 12/2007 | Davis et al. |
| 7,321,667 B2 | 1/2008 | Stach |
| 7,340,076 B2 | 3/2008 | Stach et al. |
| 7,346,184 B1 | 3/2008 | Carr et al. |
| 7,346,776 B2 | 3/2008 | Levy et al. |
| 7,349,555 B2 | 3/2008 | Rhoads |
| 7,359,528 B2 | 4/2008 | Rhoads |
| 7,372,976 B2 | 5/2008 | Rhoads et al. |
| 7,415,129 B2 | 8/2008 | Rhoads |
| 7,418,111 B2 | 8/2008 | Rhoads |
| 7,424,132 B2 | 9/2008 | Rhoads |
| 7,499,564 B2 | 3/2009 | Rhoads |
| 7,532,741 B2 | 5/2009 | Stach |
| 7,536,555 B2 | 5/2009 | Rhoads |
| 7,539,325 B2 | 5/2009 | Rhoads et al. |
| 7,548,643 B2 | 6/2009 | Davis et al. |
| 7,555,139 B2 | 6/2009 | Rhoads et al. |
| 7,567,686 B2 | 7/2009 | Rhoads |
| 7,570,784 B2 | 8/2009 | Alattar |
| 7,602,940 B2 | 10/2009 | Rhoads et al. |
| 7,602,977 B2 | 10/2009 | Rhoads et al. |
| 7,606,390 B2 | 10/2009 | Rhoads |
| 7,607,016 B2 | 10/2009 | Brunk et al. |
| 7,620,200 B2 | 11/2009 | Rhoads |
| 7,639,837 B2 | 12/2009 | Carr et al. |
| 7,643,649 B2 | 1/2010 | Davis |
| 7,656,930 B2 | 2/2010 | Tian et al. |
| 7,672,477 B2 | 3/2010 | Rhoads |
| 7,676,059 B2 | 3/2010 | Rhoads |
| 7,693,965 B2 | 4/2010 | Rhoads |
| 7,697,719 B2 | 4/2010 | Rhoads |
| 7,702,511 B2 | 4/2010 | Rhoads |
| 7,711,143 B2 | 5/2010 | Rhoads |
| 7,720,249 B2 | 5/2010 | Rhoads |
| 7,720,255 B2 | 5/2010 | Rhoads |
| 7,724,919 B2 | 5/2010 | Rhoads |
| 7,760,902 B2 | 7/2010 | Rhoads |
| 7,763,179 B2 | 7/2010 | Levy |
| 7,796,826 B2 | 9/2010 | Rhoads et al. |
| 7,831,062 B2 | 11/2010 | Stach |
| 2001/0022848 A1 | 9/2001 | Rhoads |
| 2002/0041761 A1 | 4/2002 | Glotzbach |
| 2002/0048282 A1 | 4/2002 | Kawamae et al. |
| 2002/0059880 A1 | 5/2002 | Klinefelter et al. |
| 2002/0071905 A1 | 6/2002 | Akedo |
| 2002/0080995 A1 | 6/2002 | Rhoads |
| 2002/0090110 A1 | 7/2002 | Braudaway et al. |
| 2002/0136429 A1 | 9/2002 | Stach et al. |
| 2003/0021440 A1 | 1/2003 | Rhoads |
| 2003/0025814 A1 | 2/2003 | Hunter et al. |
| 2003/0071905 A1 | 4/2003 | Yamasaki |
| 2003/0133592 A1 | 7/2003 | Rhoads |
| 2003/0138128 A1 | 7/2003 | Rhoads |
| 2004/0008866 A1 | 1/2004 | Rhoads et al. |
| 2004/0057581 A1 | 3/2004 | Rhoads |
| 2004/0128514 A1 | 7/2004 | Rhoads |
| 2004/0181671 A1 | 9/2004 | Brundage et al. |
| 2004/0263911 A1 | 12/2004 | Rodriguez |
| 2006/0028689 A1 | 2/2006 | Perry et al. |
| 2006/0062386 A1 | 3/2006 | Rhoads |
| 2007/0016790 A1 | 1/2007 | Brundage et al. |
| 2007/0172098 A1 | 7/2007 | Rhoads |
| 2007/0180251 A1 | 8/2007 | Carr |
| 2007/0201835 A1 | 8/2007 | Rhoads |
| 2008/0016360 A1 | 1/2008 | Rhoads et al. |
| 2008/0131083 A1 | 6/2008 | Rhoads |
| 2008/0131084 A1 | 6/2008 | Rhoads |
| 2008/0149713 A1 | 6/2008 | Brundage |
| 2008/0253740 A1 | 10/2008 | Rhoads |
| 2008/0270801 A1 | 10/2008 | Levy et al. |
| 2008/0275906 A1 | 11/2008 | Brundage |
| 2009/0252401 A1 | 10/2009 | Davis et al. |
| 2010/0008534 A1 | 1/2010 | Rhoads |
| 2010/0008536 A1 | 1/2010 | Rhoads |
| 2010/0008537 A1 | 1/2010 | Rhoads |
| 2010/0021004 A1 | 1/2010 | Rhoads |
| 2010/0027969 A1 | 2/2010 | Alattar |
| 2010/0040255 A1 | 2/2010 | Rhoads |
| 2010/0042843 A1 | 2/2010 | Brunk et al. |
| 2010/0119108 A1 | 5/2010 | Rhoads |
| 2010/0131767 A1 | 5/2010 | Rhoads |
| 2010/0142752 A1 | 6/2010 | Rhoads et al. |
| 2010/0146285 A1 | 6/2010 | Rhoads et al. |
| 2010/0163629 A1 | 7/2010 | Rhoads et al. |
| 2010/0172538 A1 | 7/2010 | Rhoads |
| 2011/0013802 A1 | 1/2011 | Rhoads |

FOREIGN PATENT DOCUMENTS

| | | |
|---|---|---|
| EP | 0 642 060 | 3/1995 |
| EP | 0 650 146 | 4/1995 |
| EP | 0 730 242 | 9/1996 |
| JP | 03-185585 | 8/1991 |
| WO | WO-95/13597 | 5/1995 |
| WO | WO-96/03286 | 2/1996 |
| WO | WO-96/26494 | 8/1996 |
| WO | WO-96/36163 | 11/1996 |
| WO | WO-98/43152 | 10/1998 |
| WO | WO-99/13391 | 3/1999 |
| WO | WO-99/36876 | 7/1999 |
| WO | WO01/39106 | 5/2001 |
| WO | WO-01/41056 | 6/2001 |

OTHER PUBLICATIONS

Alattar, "'Smart Images' Using Digimarc's Watermarking Technology," SPIE 12th Int'l Symposium on Electronic Imaging, Vo. 3971, No. 25, pp. 1-10, Jan. 2000.

Anand, D,. and Niranjan U. C., "Watermarking Medical Images with Patient Information", IEEE, Oct. 29, 1998, 4 pages.

Chow et al, "Forgery and Tamper-Proof Identification Document," IEEE Proc. 1993 Int. Camahan Conf. On Security Technology, 35-15 Oct. 1993, pp. 11-14.

Dautzenburg, "Watermarking Images," Department of Microelectronics and Electrical Engineering, Trinity College, Dublin, Oct. 1994, 58 pages.

Elad et al, "Restoration of a Single Superresolution Image from Several Blurred, Noisy, and Undersampled Measured Images," IEEE Trans. On Image Processing, vol. 6, No. 12, Dec. 1997, pp. 1646-1658.

Eren et al, "Robust, Object-Based High-Resolution Image Reconstruction From Low-Resolution Video," IEEE Trans. On Image Processing, vol. 6, No. 10, Oct. 1997, pp. 1446-1451.

IBM DataHiding Proposal, Version 1.0, Sep. 1997, 32 pp.

Kawaguchi et al, "Principle and Applications of BPCS Steganography," Proc. SPIE vol. 3528, Multimedia Systems and Applications, Nov. 2-4, 1998, pp. 464-473.

Komatsu et al, "A Proposal on Digital Watermarking om Document

Image Communication and Its Application to Realizing a Signature," Electronics and Communications in Japan, Part 1, vol. 73, No. 5, 1990, pp. 22-33.

Komatsu et al, "Authentication System Using Concealed Image in Telematics," Memoirs of the School of Science and Engineering, Wasdea Univ., No. 52, 1988, pp. 45-60.

Linnartz et al, "Philips Electronics Response to Call for Proposals Issued by the Data Hiding SubGroup, Copy Protection Technical Working Group," Sep. 1997, 32 pp.

Pankanti, S. et al. "Verification Watermarks on Fingerprint Recognition and Retrieval", IS&T/SPIE Conference on Security and Watermarking of Multimedia, Oct. 2000, pp. 66-78.

Perry, B. et al. "Digital Watermarks as a Security Feature for Identity Documents", Proceedings of SPIE, vol. 3973, Apr. 2000, pp. 80-87.

Phillips Electronics Response to Call for Proposals issued by the Data Hiding SubGroup, Copy Protection Technical Working Group, Sep. 1997, 33 pages.

Ratha, N. et al. "Secure Data Hiding in Wavelet Compressed Fingerprint Images", ACM Multimedia 2000 Workshop, Oct. 30, 2000, pp. 127-130.

Response to the Data Hiding System/Video Watermark Call for Proposals Issued by the Data Hiding SubGroup of the Copy Protection Technical Working Group, submitted jointly by Macrovision Corporation and Digimarc Corporation, Sep. 1997, 19 pages.

Schultz et al, "Extraction of High-Resolution Frames from Video Sequences," IEEE Trans. on Image Processing, 5(6), pp. 996-1011, 1996.

Sony Corporation, "Response for Copyright Protection System Using Watermark Technology," Sep. 1997, 15 pp.

Szepanski, "A Signal Theoretic Method for Creating Forgery-Proof Documents for Automatic Verification," Proc. of the 1979 Carnahan Conf. on Crime Countermeasures, May 16-18, 1979, pp. 101-109.

Non-Final Office Action on U.S. Appl. No. 09/563,663, mailed Feb. 26, 2003.

Non-Final Office Action on U.S. Appl. No. 09/563,663, mailed Aug. 7, 2003.

Non-Final Office Action on U.S. Appl. No. 09/563,663, mailed Apr. 21, 2004.

Non-Final Office Action on U.S. Appl. No. 09/563,663, mailed Jan. 24, 2005.

Final Office Action on U.S. Appl. No. 09/563,663, mailed Aug. 25, 2005.

Non-Final Office Action on U.S. Appl. No. 09/563,663, mailed Mar. 27, 2006.

Non-Final Office Action on U.S. Appl. No. 09/563,663, mailed Aug. 2, 2006.

Final Office Action on U.S. Appl. No. 09/563,663, mailed Nov. 1, 2006.

Non-Final Office Action on U.S. Appl. No. 09/563,663, mailed Mar. 8, 2007.

Non-Final Office Action on U.S. Appl. No. 09/563,663, mailed Aug. 23, 2007.

Notice of Allowance on U.S. Appl. No. 09/563,663, mailed Oct. 3, 2007.

U.S. Appl. No. 08/154,866, filed Nov. 18, 1993, Geoffrey B. Rhoads.
U.S. Appl. No. 08/215,289, filed Mar. 17, 1994, Geoffrey B. Rhoads.
U.S. Appl. No. 09/150,147, filed Sep. 9, 1998, Geoffrey B. Rhoads..
U.S. Appl. No. 09/151,492, filed Sep. 11, 1998, Bruce L. Davis et al.
U.S. Appl. No. 09/496,380, filed Feb. 2, 2000, Geoffrey B. Rhoads.
U.S. Appl. No. 12/881,911, filed Sep. 14, 2010, Geoffrey B. Rhoads et al.
U.S. Appl. No. 12/692,470, filed Jan. 22, 2010, Jun Tian et al.

Gargi et al, "Indexing Text Events in Digital Video Databases", International conference on Pattern Recognition, Aug. 1998, 3 pages.

Lienhart et al, "Automatic Text Recognition in Digital Videos", SPIEConference on Image and Video Processing, SPIE vol. 2666, 9 pages.

Jain, Automatic Text Location in Images and Video Frames, Pattern Recognition, vol. 31, No. 12, Dec., 1998, pp. 2055-2076.

Shim et al, "Automatic Text Extraction from Video for Content-Based Annotation and Retrieval", Proceedings of the International Conference on Pattern Recognition, 1998, 14 pages.

* cited by examiner

1

METHODS COMBINING MULTIPLE FRAMES OF IMAGE DATA

RELATED APPLICATION DATA

This application is a continuation of application Ser. No. 09/563,663, filed May 2, 2000 (now U.S. Pat. No. 7,346,184).

The subject matter of the present application is also related to that disclosed in applications Ser. No. 09/127,502, filed Jul. 31, 1998 (now U.S. Pat. No. 6,345,104); Ser. No. 09/074,034, filed May 6, 1998 (now U.S. Pat. No. 6,449,377); Ser. No. 09/343,104, filed Jun. 29, 1999; Ser. No. 09/503,881, filed Feb. 14, 2000 (now U.S. Pat. No. 6,614,914); Ser. No. 09/547,664, filed Apr. 12, 2000 (now U.S. Pat. No. 7,206,820); and in U.S. Pat. Nos. 5,841,886 and 5,862,260.

TECHNICAL FIELD

The present technology concerns techniques in which data from multiple image frames are combined into a composite image, allowing subsequent image processing to yield more reliable results. The technology is particularly detailed in the context of document authentication methods.

BACKGROUND

Digital watermarking technology, a form of steganography, encompasses a great variety of techniques by which plural bits of digital data are hidden in some other object without leaving human-apparent evidence of alteration. Many such techniques are detailed in the cited documents.

In U.S. Pat. No. 5,841,886, the present assignee disclosed an identity card that includes digitally watermarked data, e.g., hidden in a photograph of a person depicted on the card. The '886 patent noted that a passport inspector, or the like, could compare the data resulting from decoding of the watermark with other data derived from the card (e.g., text printing, bar codes, etc.). If the data did not match, then photo-swapping or other alteration of the card could be inferred.

In one particular implementation detailed below, the arrangement in the '886 patent is improved upon by providing an authentication station that includes a 2D image sensor (e.g., CCD- or CMOS-based video camera), and a computer device. The image sensor produces produce image data corresponding to the presented document. From this image data, the computer extracts two or more identification data. One is a digital watermark. The other can be represented in the form of a bar code, data glyphs, OCR data, etc. The processor then proceeds to check that the two identification data correspond in an expected fashion. If not, the document is flagged as suspect or fake. Detection of barcode, data glyphs, OCR printing, and the like is enhanced by processing plural frames of image data obtained by the image sensor.

The features of the present technology will be more readily apparent from the following detailed description, which proceeds with reference to the accompanying drawings.

DETAILED DESCRIPTION

Figure 1:
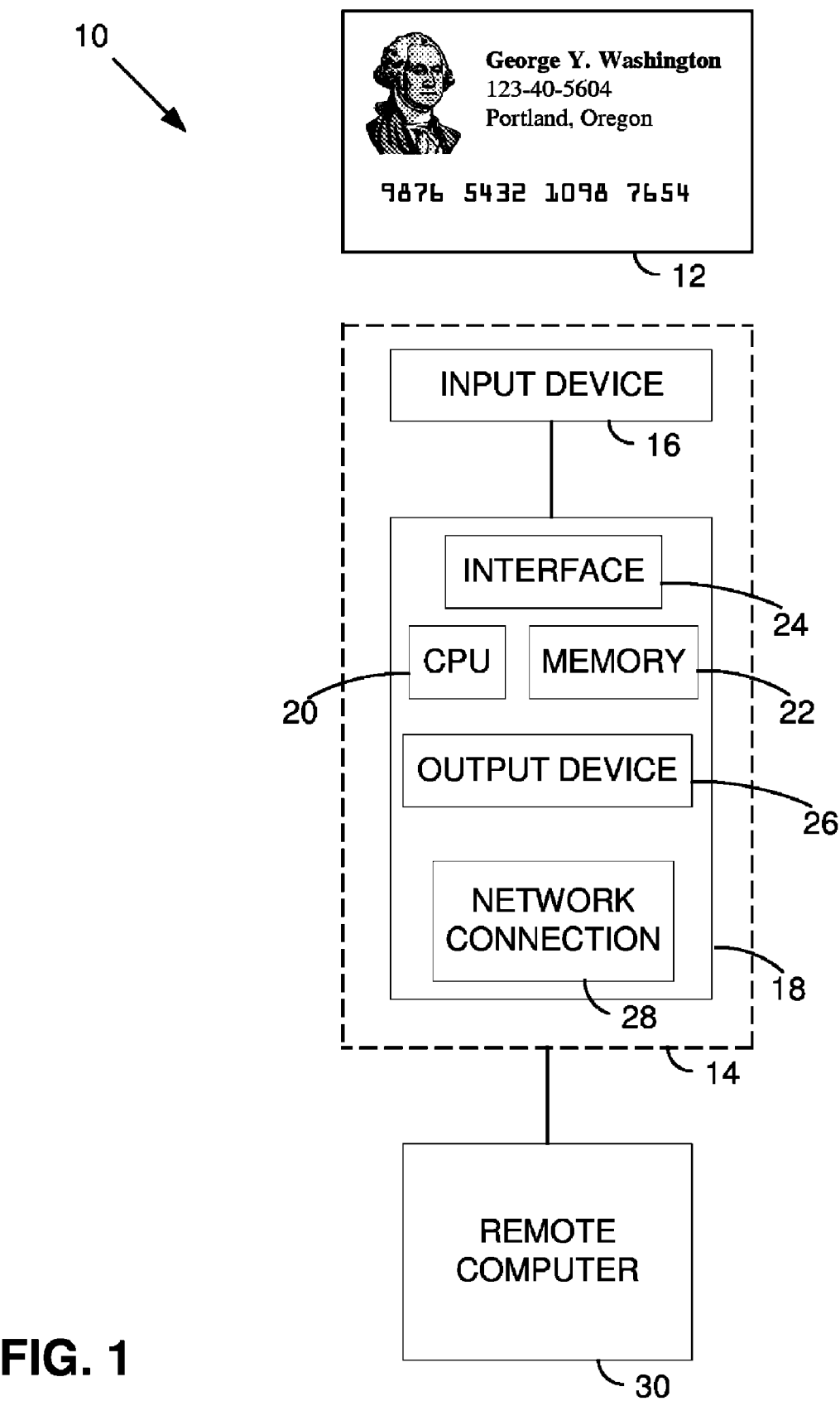
FIG. 1 shows a system according to an illustrative embodiment.

Referring to FIG. 1, in an arrangement 10, a document 12 includes plural-bit digital data steganographically encoded therein (e.g., by digital watermarking). The document can take any form; the following discussion particularly considers photo IDs, such as passports and drivers' licenses.

The encoding of the document can encompass artwork or printing on the document, the document's background, a laminate layer applied to the document, surface texture, etc. If a photograph is present, it too can be encoded. A variety of watermark encoding techniques are detailed in the cited patents and applications; many more are known to artisans in the field.

In an illustrative embodiment, the card is encoded with a payload of 32 bits. This payload is processed before encoding, using known techniques (e.g., convolutional coding, turbo codes, etc.), to improve its reliable detection in adverse conditions. In other embodiments, a payload larger or smaller than 32 bits can naturally be used (e.g., 8-256 bits).

The encoded card is presented to a reader station 14 for reading. The reader station includes an input device 16 and a processor 18.

The illustrated input device 16 is a video camera, including an image sensor comprising plural rows and columns of image sensing elements. Popular video cameras presently employ CCD or CMOS image sensors, but other technologies can likewise be employed.

The processor 18 can be a general purpose or dedicated computer, incorporating a CPU 20, memory 22, an interface 24 to the input device, a display screen or other output device 26, and optionally a network connection 28. The network connection can be used to connect, through an intranet, the internet, or otherwise, to a remote computer 30.

Suitable software programming instructions, stored in memory 22 of processor 18, or in a memory of remote computer 30, can be used to effect various types of functionality for embodiment 10.

In one embodiment, image data obtained by the camera 16 is stored in the memory of the processor 18. There it is analyzed to decode plural bits of steganographically encoded watermark data. Additionally, the frame of image data is processed to extract a second type of identification data. The second type of identification data may be encoded in bar code, data glyph, or OCR form.

Once the processor has obtained both data, the two are cross-checked to determine whether they correspond in the expect manner. This checking can take many different forms, depending on the application.

In one application, the watermark conveys textual information that is encoded in the second identification data, e.g., a bearer's name, a passport number, a social security number, etc. In such case, the processor checks that the information represented by the decoded bar code/data glyph/OCR matches the information represented by the watermark. If they do not match, the document is flagged as a likely forgery.

In another application, the watermark conveys a unique identifier (UID), or an index number. With this number, the processor 18 can query a database, e.g., resident on the remote computer 30, for additional information. In an illustrative case, the UID may be a passport number. The remote database may have a record corresponding to each valid passport number. In response to the query, the database may return some or all of the record data to the station 14. The returned data (e.g., bearer's name, or social security number) can be compared with counterpart information represented in barcode/data glyph/OCR form. Again, if they do not match, the document is flagged as a likely forgery. (The database may also return data that is used by a human inspector. For example, the database may provide a reference photograph image of the ID document holder, which the inspector can compare with the person presenting the ID document.)

In other applications, the data represented by the watermark or the other indicia is processed in some manner prior to comparison. For example, the watermark may encode a 16 bit hash value derived from the bearer's name or passport number. This latter data is represented in barcode/data glyph/OCR form. To determine document authenticity, the station 14 decodes this latter data from the image data, hashes it, and compares the resulting data with the 16 bit watermark data. If they do not match, the document is again flagged as a likely forgery.

In a particular embodiment, plural frames of image data from the camera 16 are employed in detecting the watermark data, the other data (i.e. barcode/glyph/OCR), or both. This can be effected in various ways.

To illustrate, consider the watermark data. In the watermarking technology detailed in cited application Ser. No. 09/503,881, the document is encoded both with unknown payload bits and also with known reference bits. Only if the reference bits are detected with a suitable degree of confidence are the payload bits taken as trustworthy. If, on examining a first frame of image data, the reference bits are not detected with sufficient confidence, the entire frame can be discarded, and a subsequent frame can be processed instead. Or, the results from the first frame can be accumulated with results from second or succeeding frames. The reference bits in the accumulated results are tested after each frame to determine whether they exhibit the requisite degree of trustworthiness. Accumulation continues until this test is met. The payload bits are then interpreted to yield the watermark payload.

Instead of accumulating watermark results over time, another approach is to accumulate the watermark results over space. In such an arrangement, a first frame of image data may have one portion that gives reliable watermark data, and a second portion that is unreliable (e.g., due to glare from the imaged object, positioning of the object partially out of the focal zone of the imaging device, etc.). In such case, second portion data from second or succeeding image frames can checked and used to augment the usable data from the first image frame until a sufficiently large patchwork of data is assembled for reliable watermark decoding.

Counterparts to these accumulate-over-time and accumulate-over-space approaches can likewise be used with the imaged barcode/glyph/OCR data to compile a composite set of data from which decoding can reliably proceed.

To provide a comprehensive disclosure without unduly lengthening this specification, the above-detailed patents and applications are incorporated herein by reference.

The particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the technology. Rather, we claim as our invention all such modifications as may come within the scope and spirit of the following claims and equivalents thereof.

We claim:

1. A method for processing printed subjects, the method comprising:

capturing, via an optical capture device, a first set of image data that represents a text-bearing physical object;

capturing, via the optical capture device, a second set of image data that represents the text-bearing physical object, wherein the second set of image data is different than the first set of image data;

identifying a portion of one of the first or second sets of image data that is unreliable for recognizing text from the text-bearing physical object; and using a software-configured processing, via a processor, the first and second sets of image data to recognize text therefrom;

wherein the processing takes into consideration that a portion of one of the first or second sets of image data is unreliable.

2. The method of claim 1, wherein the identifying comprises identifying a portion of at least one of the first or second sets of image data that suffers from glare.

3. The method of claim 1, wherein the identifying comprises identifying a portion of at least one of the first or second sets of image data that is not in focus.

4. The method of claim 1, wherein the processing comprises generating a new set of image data from the first and second sets of image data, taking into consideration that a portion of one of the first or second sets of image data is unreliable.

5. The method of claim 4, further comprising generating a composite set of image data, wherein the composite set of image data omits data from the portion of one of the first or second sets of image data identified as unreliable.

6. The method of claim 1, further comprising sensing digital watermark data from the text-bearing physical object, and using the digital watermark data in conjunction with the recognized text to make a decision concerning the text-bearing physical object, wherein both the capturing and sensing make use of a digital video camera that captures successive frames of image data, and wherein the text-bearing physical object comprises a photo identification document.

7. The method of claim 6, further comprising determining if the digital watermark data and the recognized text correspond in an expected fashion and, if not, flagging the photo identification document as suspect.

8. A method for processing printed subjects, the method comprising:

capturing, via an optical capture device, a first set of image data that represents a text-bearing physical object;

capturing, via the optical capture device, a second set of image data that represents the text-bearing physical object, wherein the second set of image data is different than the first set of image data;

identifying a region in the first set of image data that is relatively more reliable for recognizing text than a corresponding region of the second set of image data;

identifying a region in the second set of image data that is relatively more reliable for recognizing text than another corresponding region of the first set of image data;

combining image data from the reliable region in the first set of image data with image data from the reliable region in the second set of image data; and performing, via a processor, an optical character recognition operation to recognize text from the combined image data.

9. The method of claim 8, further comprising sensing digital watermark data from the text-bearing physical object, and using the digital watermark data in conjunction with the recognized text to make a decision concerning the text-bearing object.

10. The method of claim 9, further comprising determining if the digital watermark data and the recognized text correspond in an expected fashion and, if not, flagging a document associated with the text-bearing physical object as suspect.

11. The method of claim 9, further comprising consulting a database to obtain additional data corresponding to at least a portion of the digital watermark data, and comparing the additional data with data corresponding to the recognized text.

12. The method of claim 1, wherein the identifying a portion of one of the sets of image data that is unreliable is performed by processor.

13. The method of claim 8, wherein the identifying a portion of one of the sets of image data that is unreliable is performed by processor.

14. The method of claim 8, wherein the identifying a region in the first set if image data comprises identifying a region in the first set of data for which a corresponding region in the second set of data suffers from glare.

15. The method of claim 8, wherein the identifying a region in the first set of image data comprises identifying a region in the first set of data for which a corresponding region in the second set of data is out of focus.

16. The method of claim 1, wherein the capturing a first set of image data is performed at a first time, and wherein the capturing a second set of image data is performed at a second time different from the first time.

17. The method of claim 8, wherein the capturing a first set of image data is performed at a first time, and wherein the capturing a second set of image data is performed at a second time different from the first time.

18. A non-transitory computer-readable medium having instructions stored thereon, the instructions comprising:
   instructions for capturing a first set of image data that represents a text-bearing physical object;
   instructions for capturing a second set of image data that represents the text-bearing physical object, wherein the second set of image data is different than the first set of image data;
   instructions for identifying a portion of one of the first or second sets of image data that is unreliable for recognizing text from the text-bearing physical object; and
   instructions for processing the first and second sets of image data to recognize text therefrom, wherein the processing takes into consideration that a portion of one of the first or second sets of image data is unreliable.

19. A non-transitory computer-readable medium having instructions stored thereon, the instructions comprising:
   instructions for capturing a first set of image data that represents a text-bearing physical object;
   instructions for capturing a second set of image data that represents the text-bearing physical object, wherein the second set of image data is different than the first set of image data;
   instructions for identifying a region in the first set of image data that is relatively more reliable for recognizing text than a corresponding region of the second set of image data;
   instructions for identifying a region in the second set of image data that is relatively more reliable for recognizing text than another corresponding region of the first set of image data;
   instructions for combining image data from the reliable region in the first set of image data with image data from the reliable region in the second set of image data; and
   instructions for performing an optical character recognition operation to recognize text from the combined image data.

20. An apparatus comprising:
   an optical capture device configured to:
      capture a first set of image data that represents a text-bearing physical object; and
      capture a second set of image data that represents the text-bearing physical object, wherein the second set of image data is different than the first set of image data; and
   a processor coupled to the optical capture device, wherein the processor is configured to:
      identify a portion of one of the first or second sets of image data that is unreliable for recognizing text from the text-bearing physical object; and
      process the first and second sets of image data to recognize text therefrom, wherein the processing takes into consideration that a portion of one of the first or second sets of image data is unreliable.

21. An apparatus comprising:
   an optical capture device configured to:
      capture a first set of image data that represents a text-bearing physical object; and
      capture a second set of image data that represents the text-bearing physical object, wherein the second set of image data is different than the first set of image data; and
   a processor coupled to the optical capture device, wherein the processor is configured to:
      identify a region in the first set of image data that is relatively more reliable for recognizing text than a corresponding region of the second set of image data;
      identify a region in the second set of image data that is relatively more reliable for recognizing text than another corresponding region of the first set of image data;
      combine image data from the reliable region in the first set of image data with image data from the reliable region in the second set of image data; and
      perform an optical character recognition operation to recognize text from the combined image data.

* * * * *

UNITED STATES PATENT AND TRADEMARK OFFICE
CERTIFICATE OF CORRECTION

| | |
|---|---|
| PATENT NO. | : 8,126,272 B2 |
| APPLICATION NO. | : 12/050000 |
| DATED | : February 28, 2012 |
| INVENTOR(S) | : Carr et al. |

It is certified that error appears in the above-identified patent and that said Letters Patent is hereby corrected as shown below:

Title Page, item (57), under "Abstract", in Column 2, Line 4, delete "The image sensor produces produce image data" and insert -- The image sensor produces image data --.

Title Page 3, item (56), under "Other Publications", in Column 2, Line 2, delete "Vo. 3971," and insert -- Vol. 3971, --.

Title Page 3, item (56), under "Other Publications", in Column 2, Line 7, delete "Camahan" and insert -- Carnahan --.

Title Page 3, item (56), under "Other Publications", in Column 2, Lines 7-8, delete "35-15 Oct. 1993," and insert -- 13-15 Oct. 1993, --.

Title Page 3, item (56), under "Other Publications", in Column 2, Lines 9-10, delete "Microeletronics" and insert -- Microelectronics --.

Title Page 3, item (56), under "Other Publications", in Column 2, Line 23, delete "Watermarking om Document" and insert -- Watermarking in Document --.

Title Page 4, item (56), under "Other Publications", in Column 1, Line 7, delete ""Philips" and insert -- "Phillips --.

Title Page 4, item (56), under "Other Publications", in Column 1, Line 31, delete "Camahan" and insert -- Carnahan --.

Title Page 4, item (56), under "Other Publications", in Column 2, Line 30, delete "SPIEConference" and insert -- SPIE Conference --.

Column 1, Line 44, delete "The image sensor produces produce image data" and insert -- The image sensor produces image data --.

Signed and Sealed this
Second Day of October, 2012

David J. Kappos
*Director of the United States Patent and Trademark Office*

CERTIFICATE OF CORRECTION (continued)
U.S. Pat. No. 8,126,272 B2

Column 4, line 6, in Claim 1, delete "using a software-configured processing, via a processor," and insert -- processing, via a processor, --.

Column 4, lines 62-63, in Claim 9, delete "text-bearing object." and insert -- text-bearing physical object. --.

Column 5, line 8, in Claim 12, delete "by processor." and insert -- by a processor. --.

Column 5, line 11, in Claim 13, delete "by processor." and insert -- by a processor. --.

Column 5, line 13, in Claim 14, delete "set if image" and insert -- set of image --.